(12) United States Patent
Monostory et al.

(10) Patent No.: US 7,448,214 B2
(45) Date of Patent: Nov. 11, 2008

(54) GEOTHERMAL HYDROGEN PRODUCTION FACILITY AND METHOD

(76) Inventors: Erik Monostory, 68 Brownell St., Warren, RI (US) 02885; Jacob Mark Kandefer, 176 Penbrooke Dr., Penfield, NY (US) 14526

( * ) Notice: Subject to any disclaimer, the term of this patent is extended or adjusted under 35 U.S.C. 154(b) by 341 days.

(21) Appl. No.: 11/388,292

(22) Filed: Mar. 24, 2006

(65) Prior Publication Data
US 2007/0220887 A1    Sep. 27, 2007

(51) Int. Cl.
*F03G 7/00* (2006.01)
(52) U.S. Cl. ..................................... 60/641.2
(58) Field of Classification Search ...... 60/641.2–641.4
See application file for complete search history.

(56) References Cited

U.S. PATENT DOCUMENTS

| | | | | |
|---|---|---|---|---|
| 3,864,208 | A * | 2/1975 | Van Huisen | 376/276 |
| 4,054,175 | A * | 10/1977 | Swearingen | 165/45 |
| 4,078,904 | A | 3/1978 | Galt et al. | |
| 4,099,381 | A | 7/1978 | Rappoport | |
| 4,127,989 | A * | 12/1978 | Mickelson | 60/641.2 |
| 4,161,657 | A | 7/1979 | Shaffer, Jr. | |
| 4,479,351 | A * | 10/1984 | Awerbuch et al. | 60/641.5 |
| 4,665,705 | A * | 5/1987 | Bonham, Jr. | 60/641.5 |
| 5,911,684 | A | 6/1999 | Shnell | |
| 5,924,287 | A * | 7/1999 | Best | 60/643 |
| 6,672,078 | B2 | 1/2004 | Ovshinsky et al. | |
| 6,862,330 | B2 | 3/2005 | Boardman et al. | |
| 7,331,179 | B2 * | 2/2008 | Balan et al. | 60/641.2 |

* cited by examiner

*Primary Examiner*—Hoang M Nguyen
(74) *Attorney, Agent, or Firm*—Armstrong Teasdale LLP

(57) ABSTRACT

A system for geothermal hydrogen production comprising feed water, an input pipe extending into the earth to a sufficient depth to acquire geothermal heat, the geothermal heat capable of raising the temperature of the feed water to change the feed water from a mostly liquid state to a mostly gaseous state, an output pipe extending up through the earth to a surface of the earth, at least one filtering device coupled to and in flow communication with the output pipe to filter the heated feed water, a turbine operatively coupled to the at least one filtering device and in fluid communication with the heated feed water, a generator operatively coupled to the turbine to generate electricity, and an electrolysis apparatus coupled to and in flow communication with the at least one filtering device to receive the heated feed water, the electrolysis apparatus electrically coupled to the generator, the electrolysis apparatus is configured to disassociate the heated feed water into hydrogen and oxygen.

19 Claims, 2 Drawing Sheets

US 7,448,214 B2

GEOTHERMAL HYDROGEN PRODUCTION FACILITY AND METHOD

BACKGROUND OF THE INVENTION

This invention relates generally to the production of hydrogen and oxygen, and more particularly to using geothermal heat to provide energy for the production of hydrogen and oxygen utilizing an electrolysis apparatus.

Geothermal systems capture a steady supply of heat energy from the Earth. Traditional heating systems rely on combustion. Systems produce by-products containing harmful emissions. Some of these emissions may degrade air quality and contribute to environmental problems including acid rain and the greenhouse effect. For the health of individuals and communities, it is beneficial to utilize heating technologies that reduce or eliminate fuel combustion. In addition to improving air quality, geothermal heat utilizes renewable resources and is generally less expensive than traditional heating systems.

Additionally, hydrogen is a renewable energy and is clean-burning, carbon-free gas that is attractive in an era of concern about climate change. Hydrogen can be used in fuel cells to provide electricity for buildings and hybrid electric cars. More specifically, hydrogen fuel cell powered electric vehicles are being considered as an alternative to decrease mobile source emissions in large cities. Hydrogen, however, is costly to produce. Hydrogen is commonly stripped from natural gas, but that process leaves carbon dioxide.

BRIEF DESCRIPTION OF THE INVENTION

In one aspect, a system for geothermal hydrogen production comprising feed water, an input pipe extending into the earth to a sufficient depth to acquire geothermal heat, said geothermal heat capable of raising the temperature of said feed water to change said feed water from a mostly liquid state to a mostly gaseous state, an output pipe extending up through the earth to a surface of the earth, at least one filtering device coupled to and in flow communication with said output pipe to filter said heated feed water, a turbine operatively coupled to said at least one filtering device and in fluid communication with said heated feed water, a generator operatively coupled to said turbine to generate electricity, and an electrolysis apparatus coupled to and in flow communication with said at least one filtering device to receive said heated feed water, said electrolysis apparatus electrically coupled to said generator, said electrolysis apparatus is configured to disassociate said heated feed water into hydrogen and oxygen.

In another aspect, a method for generating hydrogen comprising converting feed water to heated feed water using geothermal energy, the heated feed water includes water and sediments, filtering the heated feed water using a filtering device, directing a first portion of the heated feed water to a turbine operatively coupled to a generator to generate electricity, directing a second portion of the heated feed water to an electrolysis apparatus, storing the generated electricity, directing a portion of the stored electricity to the electrolysis apparatus, and decomposing the water in the heated feed water in the electrolysis apparatus by breaking the covalent bonds to generate hydrogen and oxygen.

DETAILED DESCRIPTION OF THE INVENTION

Figure 1:
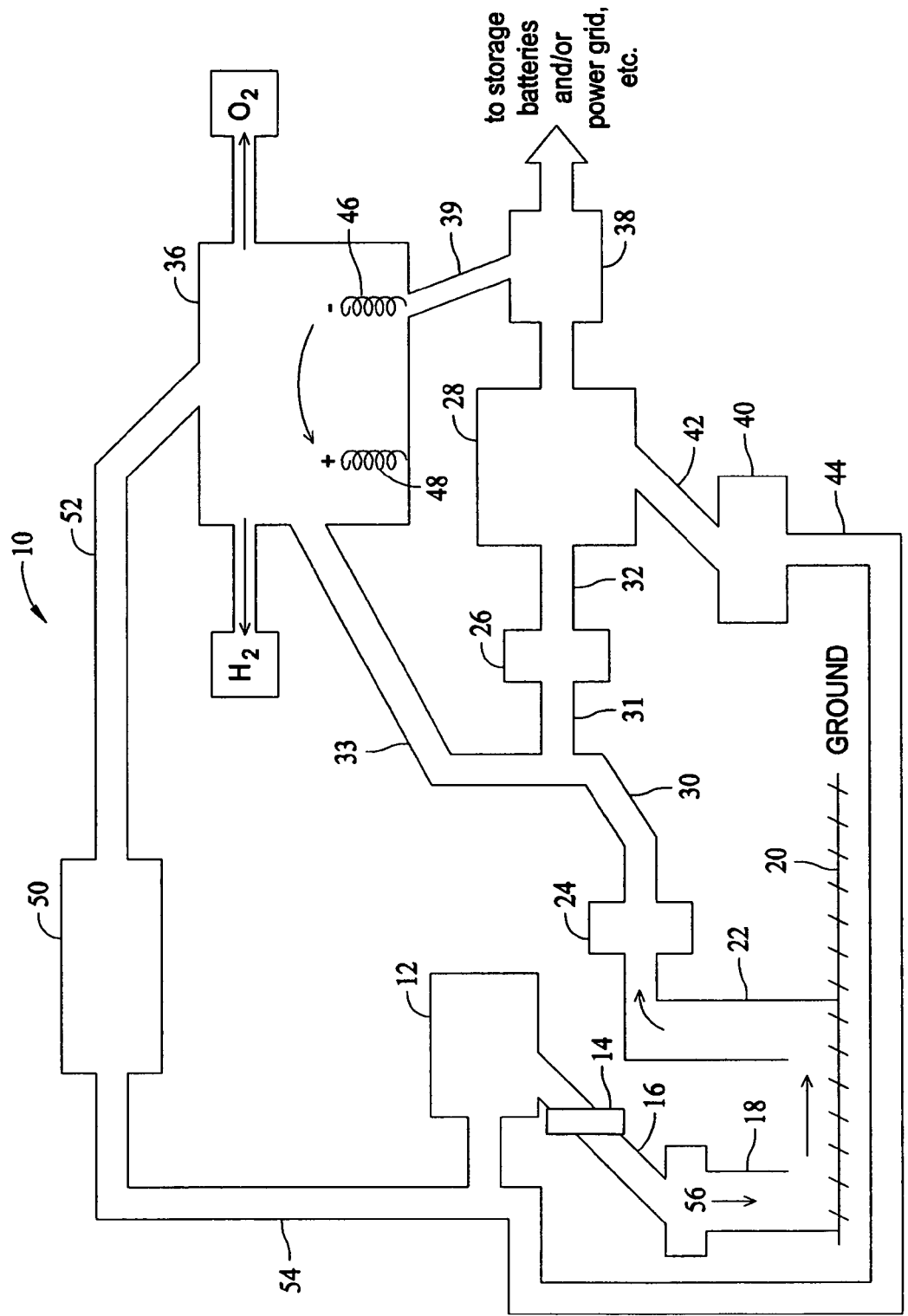
FIG. 1 is a schematic illustration of a geothermal system for producing hydrogen and oxygen that includes an electrolysis apparatus in accordance with an embodiment of the present invention.

FIG. 1 is a schematic illustration of a geothermal system for producing hydrogen and oxygen in accordance with an embodiment of the present invention. System 10 includes a feed water source 12 coupled to pump 14. Feed water source 12 is, for example, a body of water such as an ocean or lake, a desalination plant, a water clean-up system, a steam turbine condenser, or a combination thereof. Feed water line 16 extends from feed water source 12 to input pipe 18. Input pipe 18 extends into the earth to a layer of permeable rock 20. Output pipe 22 extends from permeable rock 20 up and through the surface of the earth. Output pipe 22 is coupled to, and in flow communication with, at least one filtering device 24. In the exemplary embodiment, system 10 includes two filtering devices 24, 26. In an alternative embodiment, the system includes a plurality of injection wells, a plurality of input pipes, and a plurality of output pipes.

Primary filtering device 24 is in flow communication with filtering device 26. In one embodiment, primary filtering device 24 is a steam separator wherein steam and sediments are separated. Feed line 30 extends from primary filtering device 24 and splits into first feed line 31 and second feed line 33. First feed line 31 extends from feed line 30 to filtering device 26. Second feed line 33 extends from feed line 30 to electrolysis apparatus 36. Filtering device 26 is operatively coupled to, and in flow communication with, turbine 28 by feed line 32.

Turbine 28 is operatively coupled to generator 38. Turbine 28 is further coupled to first condenser 40 by first connection pipe 42. First condenser 40 is coupled to feed water source 12 by first exit pipe 44.

Electrolysis apparatus 36 is electrically coupled to generator 38 by connection 39. In one embodiment, connection 39 is a circuit. Electrolysis apparatus 36 includes cathode 46 and anode 48. Electrolysis apparatus 36 is further coupled to, and in flow communication with, second condenser 50 by second connection pipe 52. Second condenser 50 is coupled to feed water source 12 by second exit pipe 54.

In operation, feed water 56 from feed water source 12 is pumped through feed water line 16 using a pump 14 into input pipe 18. Input pipe 18 extends from feed water source 12 into the earth to a sufficient depth to acquire geothermal heat. Feed water 56 from input pipe 18 is pumped into permeable rock 20 and across permeable rock 20 of the earth's surface where the geothermal heat raises the temperature of the feed water 56 to an acceptable level, such as 320 degrees Celsius. The depth of the ground necessary to achieve an acceptable temperature varies depending on the location of the drilling. Geothermal heat converts feed water 56 from a liquid state to a mostly gaseous state. In the gaseous state, heated feed water 56 escapes from the high pressure environment of the inner earth through output pipe 22 that extends from permeable rock 20 of the earth up to and through the surface of the earth. Heated feed water 56 includes steam and sediments.

Heated feed water 56 is directed from output pipe 22 to primary filtering device 24 wherein primary filtering device 24 filters out the sediments in heated feed water 56. A first portion of heated feed water 56 is directed from primary filtering device 24 in gaseous form through feed line 30 into first feed line 31 and further into filtering device 26. Filtering device 26 further filters out sediments in heated feed water 56 to prevent salts and/or electrolytes from corroding turbine blades of turbine 28.

The first portion of heated feed water 56 exits filtering device 26 and is directed through feed line 32 into turbine 28. Energy in the first portion of the heated feed water 56 spins turbine 28 which is used to generate electricity. In one embodiment, the electricity is stored in batteries for future use. In another embodiment, the electricity is used to power the geothermal system. Furthermore, the electricity could be used wherein the generator is coupled to a power grid.

Excess heated feed water 56 exits turbine 28 and is directed to first condenser 40 through first connection pipe 42. First condenser 40 cools heated feed water 56 converting heated feed water 56 from a gaseous state into a liquid state. In the liquid state, heated feed water 56 is pumped back into feed water source 12 through first exit pipe 44. In an alternative embodiment, heated feed water 56 exits turbine 28 and is directed to other heaters and filters.

A second portion of heated feed water 56 is directed in gaseous form from primary filtering device 24, through feed line 30 and second feed line 33, and into electrolysis apparatus 36. Primary filtering device 24 filters out sediments in heated feed water 56; however, some salts remain in heated feed water 56. The remaining salts aid in the electrolysis process. Heated feed water 56 enters an enclosed area of electrolysis apparatus 36 including two electrodes, a cathode 46 and an anode 48. Heated feed water 56 enters electrolysis apparatus 36 at an elevated temperature. Electrolysis apparatus 36 is used to break the bonds between oxygen and hydrogen of heated feed water 56 thus producing both hydrogen and oxygen.

A portion of the generated electricity is used to power electrolysis apparatus 36. Electricity flows from cathode 46 through heated feed water 56 in electrolysis apparatus 36 and exits through anode 48. Cathode 46 attracts hydrogen and anode 48 attracts oxygen. Hydrogen and oxygen are then stored for later use.

Excess heated feed water 56 exits electrolysis apparatus 36 and heated feed water 56 is directed to second condenser 50 through second connection pipe 52. Second condenser 50 cools heated feed water 56 converting heated feed water 56 into a liquid state. In the liquid state, heated feed water 56 is pumped back into feed water source 12 through second exit pipe 54. In an alternative embodiment, heated feed water 56 exits electrolysis apparatus 36 and flows to other heaters and filters.

Figure 2:
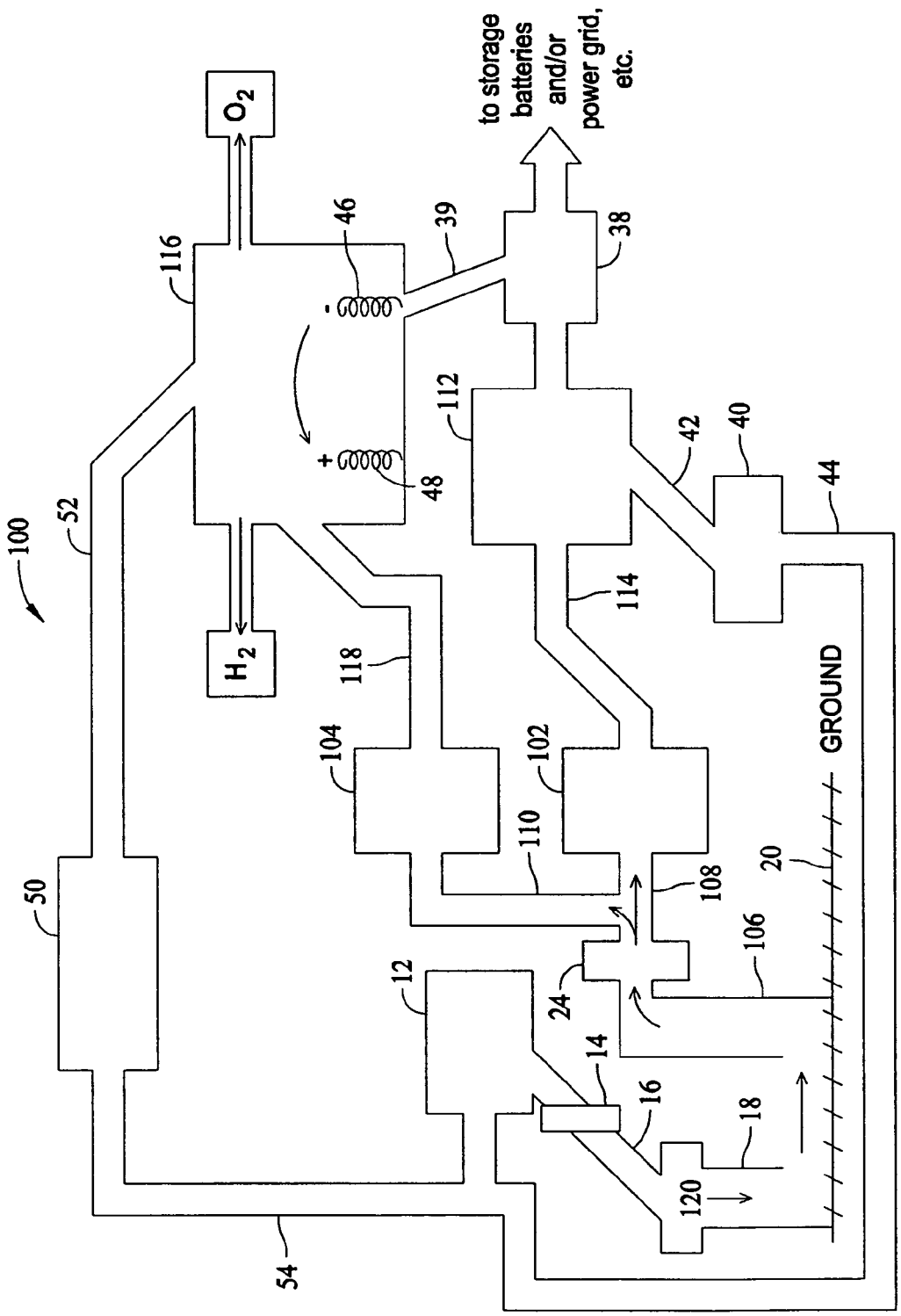
FIG. 2 is a schematic illustration of a geothermal system for producing hydrogen and oxygen that includes an electrolysis apparatus in accordance with an alternative embodiment of the present invention.

FIG. 2 is a schematic illustration of a geothermal system 100 for producing hydrogen and oxygen in accordance with an alternative embodiment of the present invention. System 100 is similar to system 10 above except that instead of two filtering devices, primary filtering device 24 and filtering device 26, system 100 includes a primary filtering device 24, a first filtering device 102 and a second filtering device 104.

Output pipe 106 is coupled to and in flow communication with at least one primary filtering device 24. Primary filtering device 24 is coupled to at least two filtering devices 102 and 104 by first output pipe 108 and a second output pipe 110 respectively.

First filtering device 102 is operatively coupled, and in flow communication with, turbine 112 by first feed line 114. Second filtering device 104 is operatively coupled, and in flow communication with, electrolysis apparatus 116 by second feed line 118.

System 100 operates similar to system 10 above except that the heated feed water 120 is directed through three filtering devices 24, 102, 104. Heated feed water 120 is directed from output pipe 106 into primary filtering device 24.

Primary filtering device 24 filters out sediments in heated feed water 120. A first portion of heated feed water 120 is directed from primary filtering device 24 to first filtering device 102 through first output pipe 108. First filtering device 102 further filters out residual sediments in the first portion of heated feed water 120. First portion of heated feed water 120 is then directed from first filtering device 102 in gaseous form through first feed line 114 into turbine 112.

Primary filtering device 24 filters out sediments in heated feed water 120. A second portion of heated feed water 120 is directed from primary filtering device 24 to second filtering device 104 through second output pipe 110. Second filtering device 104 further filters out the sediments in the second portion of heated feed water 120. Second portion of heated feed water 120 is directed from second filtering device 104 in gaseous form through second feed line 118 into electrolysis apparatus 116.

While the invention has been described in terms of various specific embodiments, those skilled in the art will recognize that the invention can be practiced with modification within the spirit and scope of the claims.

What is claimed is:

1. A system for geothermal hydrogen production comprising;
    feed water;
    an input pipe extending into the earth to a sufficient depth to acquire geothermal heat, said geothermal heat capable of raising the temperature of said feed water to change said feed water from a mostly liquid state to a mostly gaseous state;
    an output pipe extending up through the earth to a surface of the earth;
    at least one filtering device coupled to and in flow communication with said output pipe to filter said heated feed water;
    a turbine operatively coupled to said at least one filtering device and in fluid communication with said heated feed water;
    a generator operatively coupled to said turbine to generate electricity, said generator configured to supply electricity to a power grid; and
    an electrolysis apparatus coupled to and in flow communication with said at least one filtering device to receive said heated feed water, said electrolysis apparatus electrically coupled to said generator, said electrolysis apparatus configured to disassociate said heated feed water into hydrogen and oxygen.

2. A system in accordance with claim 1 wherein further comprising a pump to pump said feed water through said input pipe.

3. A system in accordance with claim 1 wherein said at least one filtering device is configured to accept a portion of said heated feed water.

4. A system in accordance with claim 1 wherein said heated feed water includes sediments, said at least one filtering device is configured to filter out sediments from said heated feed water.

5. A system in accordance with claim 1 wherein said turbine is coupled to said generator to generate electricity, said electricity is stored to run an energy system.

6. A system in accordance with claim 1 wherein said electrolysis apparatus includes an anode and a cathode, wherein during an electrolysis process in said electrolysis apparatus, said cathode attracts hydrogen and said anode attracts oxygen of said heated feed water.

7. A system in accordance with claim 1 wherein said turbine comprises an outlet pipe coupled to at least one of a feed water heater, a condenser, and said at least one filter.

8. A system in accordance with claim 1 wherein said electrolysis apparatus comprises an outlet pipe coupled to at least one of a feed water heater, a condenser, and said at least one filter.

9. A system in accordance with claim 1 wherein said generator is operatively coupled to a storage application.

10. A method for generating hydrogen comprising:
converting feed water to heated feed water using geothermal energy, the heated feed water includes water and sediments;
filtering the heated feed water using a filtering device;
directing a first portion of the heated feed water to a turbine operatively coupled to a generator to generate electricity;
directing a second portion of the heated feed water to an electrolysis apparatus;
storing the generated electricity;
directing a portion of the stored electricity to the electrolysis apparatus;
directing a portion of the stored electricity to power grid; and
disassociating the water in the heated feed water in the electrolysis apparatus by breaking the covalent bonds to generate hydrogen and oxygen.

11. A method in accordance with claim 10 wherein converting water to steam comprises pumping the feed water through a pipe in the earth to a permeable layer of rock, pumping the water across the permeable rock creating heated feed water, and pumping the heated feed water through the pipe until the heated feed water reaches the surface of the earth.

12. A method in accordance with claim 10 further comprising filtering the heated feed water using at least one filtering device to filter out sediments in the heated feed water.

13. A method in accordance with claim 10 wherein directing the first portion of the heated feed water to the turbine creating mechanical energy, the mechanical energy is used by generator to generate electricity.

14. A method in accordance with claim 10 further comprising directing excess first portion of the heated feed water to at least one of condensers, filters, and feedwater heaters.

15. A method in accordance with claim 10 wherein directing the second portion of the heated feed water into an electrolysis apparatus.

16. A method in accordance with claim 10 wherein directing stored electricity into the electrolysis apparatus comprises directing the electricity through the cathode, through the second portion of the heated feed water, and entering the anode.

17. A method in accordance with claim 10 wherein decomposing the second portion of the heated feed water comprises hydrogen attracting to the cathode and the oxygen attracting to the anode.

18. A method in accordance with claim 10 further comprising directing excess second portion of the heated feed water from the electrolysis apparatus to at least one of condensers, filters, and feedheaters.

19. A method in accordance with claim 10 further comprising directing electricity from the generator to a storage application.

* * * * *